Feb. 5, 1952     R. AEBERHARD     2,584,778
INDICATING DEVICE FOR PERIODICAL MEASURINGS
Filed May 23, 1949
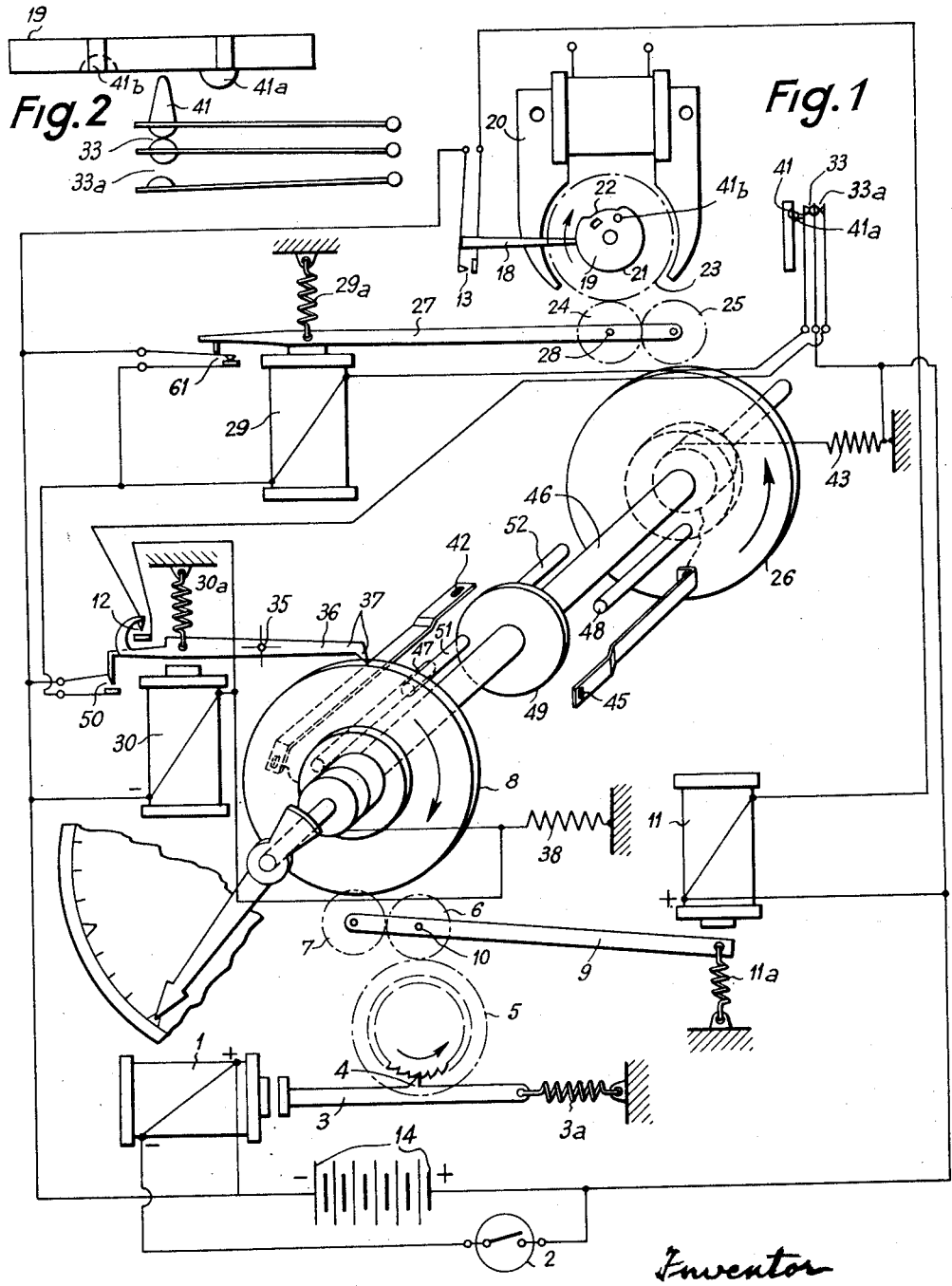
Inventor
Rudolf Aeberhard
by Karkhishoili, Atty.

Patented Feb. 5, 1952

2,584,778

UNITED STATES PATENT OFFICE 2,584,778

INDICATING DEVICE FOR PERIODICAL MEASURINGS

Rudolf Aeberhard, Bern, Switzerland

Application May 23, 1949, Serial No. 94,917
In Switzerland May 31, 1948

6 Claims. (Cl. 235—104)

My invention relates to speed indicating devices and more particularly to an instrument designed to indicate the speed of flow of a liquid.

It is an object of my invention to provide a speed indicator of this type which is simpler in construction and more efficient and reliable in operation than other instruments hitherto available.

Known speed indicators for running liquids are based upon the sending out of impulses, the frequencies of which are proportional to the speed to be measured, and the leading of these impulses onto a device indicating the mean speed measured within an always constant period of time.

The indicating device according to my invention for periodical measurings of the kind referred to comprises an impulse storage wheel loosely mounted on an indicator shaft and periodically coupled with an impulse relay, further a driving-back wheel loose on the same shaft and caused by a motor to rotate periodically in a direction of rotation counter to that of the impulse-storage wheel. The indicator shaft carries a cam disk and each one of the impulse-storage and driving-back wheels carries a driving pin. These driving pins extend into the orbits of corresponding pins fastened on the cam disk.

In the embodiment of my invention shown diagrammatically by way of example in the drawing affixed to this specification and forming part thereof, both the impulse-storage and driving-back wheels carry along contact laminae which are longer than half the distance between the impulse-storage and driving-back wheels. The laminae are fixed on the same radius and on the same side as the corresponding driving pins mentioned before. The driving-back wheel, after being uncoupled from the motor, is led back into the starting position by a spring. The impulse-storage wheel, after being uncoupled from the impulse relay, remains in its locked position which is reached by the impulses, and will not return into the starting position before having been unlocked. The unlocking may be performed by means of a relay whose circuit is being closed by means of the contact laminae mentioned above.

As shown on the drawing, the two ends of the windings of an impulse relay 1 are connected to the negative terminal of a current source 14 and through an impulse sender 2 to the positive terminal of the same source. The impulse sender may be designed in any manner, e. g. as a periodically interrupted contact disk fixed on the shaft of a water propeller. The armature 3 of relay 1 drives a gear (schematically indicated by a wheel 5) by means of a pawl 4. This gear may be caused to drive the toothed impulse storage wheel 8 by means of coupling wheels 6 and 7, which are carried by the coupling lever 9. This lever, which turns around an axle 10, is held in the coupling position by means of a spring 11a and may be brought out of the coupling position by the armature of a relay 11, which is connected through contact 13 to the negative terminal of the source 14.

The contact 13 is opened and closed rhythmically by means of a finger 18 sliding on the radial control surfaces 21 and 22 of a time disk 19. This time disk and a toothed wheel 23 are fixed on the shaft of a synchronous motor 20. The dimensions and the speed of rotation of the time disk are so chosen that the finger 18 will slide on the control surface 21 during 120 seconds (measuring period) and on the cut-out portion 22 during 15 seconds (intermediate period). The contact 13 is opened during the measuring period and closed during the intermediate period. During the measuring period the relay 11 is de-energized, i. e. the spring 11a couples the wheel 5 with the impulse-storage wheel 8. Hereby the impulse-storage wheel is caused to turn out of its position of rest. The total angle through which it turns, is proportional to the number of impulses sent out during the measuring period. This rotation takes place counter to the effect of a driving-back spring 38. By the end of the measuring period the finger 18 falls into the cut-out portion 22 and causes the contact 13 to be closed. A circuit can now be traced from minus through contact 13 and relay 11 to plus. The relay is energized, attracts its armature and causes the gear 6, 7 to unlock the toothed impulse-storage wheel 8. The pawl 37, however, keeps the impulse-storage wheel 8 in the position to which it had been moved by impulses (counter to the effect of the spring 38).

The time disk 19 carries on its rear side a second control surface comprising an excavation 41b and a cam 41a (Fig. 2). This control surface operates a double contact 33, 33a. During the measuring period, when the finger 41 is sliding on the plane, the contact 33a is opened, while contact 33 is closed. The contacts 33, 33a serve to control the relays 29 and 30, respectively. When the relay 29 is de-energized, a spring 29a causes the wheels 24, 25 to engage the toothed wheel 23 and the leading-back wheel 26 by means of the lever 27 which can turn about the axle 29. During the measuring period the relay 29 is energized. A circuit can then be traced from the positive terminal of the current source 14 through contact 33, relay 29 and self-locking contact 61 to minus. When being energized, the relay 29 causes the lever 27 to turn about 28 and to disengage the wheels 24, 25 from the toothed wheel 23 and from the leading-back wheel 26. The leading-back wheel, which, when coupled with the synchronous motor, had been caused to rotate in the direction of the arrow, is now released and returns into its starting position under the action of the spring 43. By the end of the measuring period the finger 41 falls into the excavation 41b and for a short time causes the contact 33, which heretofore had been closed, to be opened too, so that both contacts 33 and 33a are opened and both relays 29 and 30 de-energized. Immediately thereafter the contacts 33, 33a, are closed again, the finger 41 sliding on the cam 41a. The relays 29, 30, however, are still de-energized.

The impulse-storage and driving-back wheels are freely rotatable on the pointer or indicator shaft 46. Each of them carries a pin (47 and 48, respectively), facing each other and fixed on the same radius on which are fastened the contact laminae 42 and 45. The distance between the wheels 8 and 26 is so chosen that it is shorter than the double length of the contact laminae 42 and 45, so that the two wheels cannot rotate independently without contacting each other. The driver disk 49 is mounted on the pointer shaft and carries two fingers 51 and 52 extending in parallel to the pointer shaft. These fingers are so mounted that they extend into the orbits of the pins 47 and 48. The leading-back wheel 26, when coupled with the synchronous motor, is rotating in the direction of the arrow, counter to the direction of rotation of the impulse-storage wheel 8. When this rotation has proceeded until the two contact laminae 42, 45 mounted on the wheels 8 and 26 touch each other, a circuit can be traced from minus, relay 30, contact laminae 42 and 45, spring 43 to plus. Relay 30 is energized and locks itself on contact 12. The pawl 37 on lever 36, which can turn about 35, is released against the action of the spring 36a. The impulse-storage wheel is liberated and returned into the starting position by the spring 38. When the relay 30 is energized, contact 50 is also closed. A circuit can now be traced from minus through contact 50, relay 29, contact 33 to plus. The relay 29 is energized and locks itself on contact 61. The wheels 24, 25, and the lever 27 are termed hereinafter the "first coupling means," and the relay 29 bringing the same into inoperative position is termed hereinafter "the first relay." The wheels 6, 7, and the lever 9 are termed hereinafter the "second coupling means," and the relay 11 bringing the same into inoperative position is termed hereinafter the "second relay." The springs 29a and 11a are termed hereinafter, respectively, the first and second resilient means urging the first relay 29 and the second relay 11, respectively, into operative position. The lever 36 and the pawl 37 are termed hereinafter the "detent," and the relay 30 releasing the same from the holding position thereof is termed hereinafter the "third relay." Contacts 33, 13, and 42, 45 are termed hereinafter, respectively, the "first, second, and third contacts."

The device operates as follows:

Impulses of a frequency which is proportional to the speed to be measured, are sent onto the impulse relay 1 by means of the impulse key 2. The impulses cause the armature 3 of the impulse relay 1 to perform a translatory movement. The armature 3 by means of its pawl 4 turns the wheel 5 forward one pitch by impulse. The rotatory angle gone through within a certain period of time, e. g. 120 seconds, is proportional to the number of impulses and, therefore, to the speed to be measured. When during the rotation of the impulse-storage wheel 8 the pin 47 of this wheel meets the finger 51 of the disk 49, the latter is carried along with the wheel 8. By the end of the measuring period, when the gear 6, 7 has been removed from the wheel 8, and the latter has been stopped by the pawl 37, the wheel 26 is caused to rotate. If the speed measured during the past period has increased relative to the one measured within the preceding period, the wheel 26, by closing the contact 42, 45, causes the wheel 8 to return into its original position, the disk 49 and the pointer remaining in their positions. When, however, the speed measured within the last period has decreased with reference to the speed of the preceding period, the wheel 26 pushes the disk 49 back until it reaches the position corresponding to the speed now measured.

This position will have been reached, when the laminae 42 and 45 close their contact, causing the wheel 8 to return into its original position. The driving-back wheel 26 is returned to the initial position thereof by the spring 43 after the energization of relay 29 following the energization of relay 30 brought about by the closure of contact 42, 45.

I wish it to be understood that I do not desire to be limited to the exact details shown and described, for obvious modifications will occur to a person skilled in the art.

I claim:

1. A speed indicating device in which an indicator shaft is driven by means of a driver disk secured to the shaft and cooperating with an impulse-storing wheel and a driving-back wheel, both being arranged on the shaft for rotation with respect to the same, comprising in combination: an electric motor having a rotor; first coupling means arranged between said rotor and the driving-back wheel for driving the same in one direction, said first coupling means having an operative position and an inoperative position; a first relay bringing said first coupling means into inoperative position; an impulse relay; second coupling means arranged between said impulse relay and the impulse-storing wheel for driving the same in the direction opposite to that in which said first coupling means drives said driving-back wheel, said second coupling means having an operative position and an inoperative position; a second relay for bringing said second coupling means into inoperative position; and first and second contact means responsive to the angular position of said rotor and connected in series with said first relay and said second relay, respectively, said first contact means and said second contact means being controlled by said rotor so as to operate at different angular positions thereof, whereby said first relay and said second relay are alternately energized in response to the angular position of said rotor and the impulse-storing wheel is coupled to said impulse relay during a first angular portion of the rotation of said rotor and the driving-back wheel is coupled to said rotor during a second angular portion of the rotation of said rotor different from the first angular portion of the rotation of said rotor.

2. A speed indicating device in which an indicator shaft is driven by means of a driver disk secured to the shaft and cooperating with an impulse-storing wheel and a driving-back wheel, both being arranged on the shaft for rotation with respect to the same, comprising in combination: an electric motor having a rotor; first coupling means arranged between said rotor and the driving-back wheel for driving the same in one direction, said first coupling means having an operative position and an inoperative position; first resilient means urging said first coupling means into operative position; a first relay bringing said first coupling means into inoperative position; an impulse relay; second coupling means arranged between said impulse relay and the impulse-storing wheel for driving the same in the direction opposite to that in which said first coupling means drives said driving-back wheel, said second coupling means having an operative position and an inoperative position; second resilient means urging said second coupling means into operative position; a second relay for bringing said second coupling means into inoperative position; and first and second contact means responsive to the angular position of said rotor and connected in series with said first relay and said second relay, respectively, said first contact means and said second contact means being controlled by said rotor so as to operate at different angular positions thereof, whereby said first relay and said second relay are alternately energized in response to the angular position of said rotor, and the impulse-storing wheel is coupled to said impulse relay during a first angular portion of the rotation of said rotor and the driving-back wheel is coupled to said rotor during a second angular portion of the rotation of said rotor different from the first angular portion of the rotation of said rotor.

3. A speed indicating device in which an indicator shaft is driven by means of a driver disk secured to the shaft and cooperating with an impulse-storing wheel and a driving-back wheel, both being arranged on the shaft for rotation with respect to the same, comprising in combination: an electric motor having a rotor; first coupling means arranged between said rotor and the driving-back wheel for driving the same in one direction, said first coupling means having an operative position and an inoperative position; first resilient means urging said first coupling means into operative position; a first relay bringing said first coupling means into inoperative position; an impulse relay; second coupling means arranged between said impulse relay and the impulse-storing wheel for driving the same in the direction opposite to that in which said first coupling means drives said driving-back wheel, said second coupling means having an operative position and an inoperative position; second resilient means urging said second coupling means into operative position; a second relay for bringing said second coupling means into inoperative position; a detent cooperating with the impulse-storing wheel and adapted to hold the same in position after said second coupling means have been brought into inoperative position; a third relay for releasing said detent from the holding position thereof; and first and second contact means responsive to the angular position of said rotor and connected in series with said first relay, said second relay, and said third relay, respectively, said first contact means and said second contact means being controlled by said rotor so as to operate at different angular positions thereof, whereby said first relay and said second relay are alternately energized in response to the angular position of said rotor and the impulse-storing wheel is coupled to said impulse relay during a first angular portion of the rotation of said rotor and the driving-back wheel is coupled to said rotor during a second angular portion of the rotation of said rotor different from the first angular portion of the rotation of said rotor.

4. A speed indicating device in which an indicator shaft is driven by means of a driver disk secured to the shaft and cooperating with an impulse-storing wheel and a driving-back wheel, both being arranged on the shaft for rotation with respect to the same, comprising in combination: an electric motor having a rotor; first coupling means arranged between said rotor and the driving-back wheel for driving the same in one direction, said first coupling means having an operative position and an inoperative position; first resilient means urging said first coupling means into operative position; a first relay bringing said first coupling means into inoperative position; an impulse relay; second coupling means arranged between said impulse relay and the impulse-storing wheel for driving the same in the direction opposite to that in which said first coupling means drives said driving-back wheel, said second coupling means having an operative position and an inoperative position; second resilient means urging said second coupling means into operative psition; a second relay for bringing said second coupling means into inoperative position; a detent cooperating with the impulse-storing wheel and adapted to hold the same in position after said second coupling means have been brought into inoperative position; a third relay for releasing said detent from the holding position thereof; first and second contact means responsive to the angular position of said rotor and connected in series with said first relay, said second relay, and said third relay, respectively, said first contact means and said second contact means being controlled by said rotor so as to operate at different angular positions thereof; and third contact means arranged in series to said third relay and adapted to be closed in a predetermined relative position of the impulse-storing wheel and the driving-back wheel, whereby said first relay and said second relay are alternately energized in response to the angular position of said rotor and the impulse-storing wheel is coupled to said impulse relay during a first angular portion of the rotation of said rotor and the driving-back wheel is coupled to said rotor during a second angular portion of the rotation of said rotor different from the first angular portion of the rotation of said rotor.

5. A speed indicating device in which an indicator shaft is driven by means of a driver disk secured to the shaft and cooperating with an impulse-storing wheel and a driving-back wheel, both being arranged on the shaft for rotation with respect to the same, comprising in combination: an electric motor having a rotor; first coupling means arranged between said rotor and the driving-back wheel for driving the same in one direction, said first coupling means having an operative position and an inoperative position; first resilient means urging said first coupling means into operative position; a first relay bringing said first coupling means into inoperative position; an impulse relay; second coupling means arranged between said impulse relay and the impulse-storing wheel for driving the same in the direction opposite to that in which said first coupling means drives said driving-back wheel, said second coupling means having an operative position and an inoperative position; second resilient means urging said second coupling means into operative position; a second relay for bringing said second coupling means into inoperative position; a current source; a first circuit connecting said first relay to said current source; a first contact in said first circuit, said first contact being controlled by said rotor so as to be closed for a predetermined portion of the rotation thereof; a second circuit connecting said second relay to said current source; and a second contact in said second circuit, said second contact being controlled by said rotor so as to be opened substantially for the predetermined portion of the rotation thereof during which said first contact is being closed, whereby said first relay and said second relay are alternately energized in response to the angular position of said rotor, and the impulse-storing wheel is coupled to said impulse relay during a first angular portion of the rotation of said rotor and the driving-back wheel is coupled to said rotor during a second angular portion of the rotation of said rotor different from the first angular portion of the rotation of said rotor.

6. A speed indicating device in which an indicator shaft is driven by means of a driver disk secured to the shaft and cooperating with an impulse-storing wheel and a driving-back wheel, both being arranged on the shaft for rotation with respect to the same, comprising in combination: an electric motor having a rotor; first coupling means arranged between said rotor and the driving-back wheel for driving the same in one direction, said first coupling means having an operative position and an inoperative position; first resilient means urging said first coupling means into operative position; a first relay bringing said first coupling means into inoperative position; an impulse relay; second coupling means arranged between said impulse relay and the impulse-storing wheel for driving the same in the direction opposite to that in which said first coupling means drives said driving-back wheel, said second coupling means having an operative position and an inoperative position; second resilient means urging said second coupling means into operative position; a second relay for bringing said second coupling means into inoperative position; a current source; a first circuit connecting said first relay to said current source; a first contact in said first circuit, said first contact being controlled by said rotor so as to be closed for a predetermined portion of the rotation thereof; a second circuit connecting said second relay to said current source; a second contact in said second circuit, said second contact being controlled by said rotor so as to be opened substantially for the predetermined portion of the rotation thereof during which said first contact is being closed; a detent cooperating with the impulse-storing wheel and adapted to hold the same in position after said second coupling means have been brought into inoperative position; a third relay for releasing said detent from the holding position thereof; and a third contact arranged in series with said third relay and said current source and being controlled by the impulse-storing wheel and the driving-back wheel so as to be closed in a predetermined relative position thereof, whereby said first relay and said second relay are alternately energized in response to the angular position of said rotor, and the impulse-storing wheel is coupled to said impulse relay during a first angular portion of the rotation of said rotor and the driving-back wheel is coupled to said rotor during a second angular portion of the rotation of said rotor different from the first angular portion of the rotation of said rotor.

RUD. AEBERHARD.

REFERENCES CITED

The following references are of record in the file of this patent:

UNITED STATES PATENTS

| Number | Name | Date |
| --- | --- | --- |
| 1,979,163 | Lemaigren | Oct. 30, 1934 |
| 2,137,443 | Chappell et al. | Nov. 22, 1938 |
| 2,194,237 | Shepard | Mar. 19, 1940 |

FOREIGN PATENTS

| Number | Country | Date |
| --- | --- | --- |
| 107,591 | Great Britain | June 27, 1918 |